Patented Nov. 9, 1943

2,333,928

UNITED STATES PATENT OFFICE 2,333,928

TERTIARY BUTYL ALCOHOL-FORMALDEHYDE CONDENSATION PRODUCT AND METHOD FOR PREPARING THE SAME

Mortimer T. Harvey, East Orange, N. J., assignor to Harvel Research Corporation, a corporation of New Jersey No Drawing. Original application October 10, 1942, Serial No. 461,597. Divided and this application October 10, 1942, Serial No. 461,598

6 Claims. (Cl. 260—638)

This invention relates to methods of making condensation products of tertiary aliphatic alcohols and formaldehyde and to the products of such methods. The present application is a division of my application Serial No. 461,597, filed October 10, 1942.

Heretofore, it has been proposed to react tertiary aliphatic alcohols with formaldehyde under anhydrous conditions and in the presence of a mineral acid. In Example 6 of the United States patent to Ellis, 2,143,870, the patentee describes the treatment under anhydrous conditions of tertiary butyl alcohol with trioxymethylene in the presence of hydrochloric acid, and claims to have obtained di-tertiary-butyl formal.

I have discovered that novel products may be obtained by employing new methods of treating a tertiary alcohol with formaldehyde. According to my novel methods, tertiary butyl alcohol may be treated with an aqueous solution of formaldehyde in the presence of a mineral acid. By employing these methods, I have found that one mole of tertiary butyl alcohol will completely react with more than one mole and with as high as about four to seven moles of the formaldehyde in aqueous solution. In the course of my experimentations, I have discovered that when a mixture of tertiary butyl alcohol and aqueous solution of formaldehyde is heated in the presence of a catalyst such as a mineral acid, the formaldehyde and the alcohol react to produce a product which continues to react with the formaldehyde notwithstanding the presence of unreacted alcohol. This reaction continues until more than one mole of the formaldehyde has completely reacted with one mole of tertiary butyl alcohol, where the mole ratio of formaldehyde to the alcohol is greater than one and even in those cases where equimolecular proportions of the alcohol and formaldehyde are used and also in those cases where the alcohol and formaldehyde in aqueous solution were present in the ratio as low as two to one. According to this invention, it has been found preferable to employ one to eight moles of formaldehyde in aqueous solution to one mole of tertiary butyl alcohol. When the eight or more moles of formaldehyde in aqueous solution was employed with one mole of tertiary butyl alcohol, it was found that it was in excess of that which would react with the alcohol and therefore a proportion thereof was present at the end of the reaction period.

The methods of the present invention and the products thereof can be disclosed best by showing how they are produced, for which the following are given as illustrative examples.

*Example 1.*—One mole of formaldehyde and one mole of tertiary butyl alcohol at atmospheric pressure.

|  | Grams |
|---|---|
| 40% water solution HCHO | 425 |
| Tertiary butyl alcohol | 370 |
| 50% sulphuric acid | 100 |

The formaldehyde, tertiary butyl alcohol, sulphuric acid and water in the above listed amounts were dissolved together and heated to boiling under a reflux condenser for about six hours, after which the reaction mixture was neutralized with forty grams of sodium hydroxide. The neutralized mixture separated into two layers and the top layer, after being separated from the bottom layer, was distilled fractionally, one of the fractions being a large quantity of tertiary butyl alcohol. No formaldehyde could be detected in the products of the reaction. The fraction above 120° C. contained the hydroxyl group and had a pleasant odor. It was soluble in alcohol, benzene and water and insoluble in gasoline. A fraction between 230° C. and 250° C. contains the hydroxyl group, has a pleasant odor and an analysis for carbon, hydrogen and oxygen gave the following results:

|  | Per cent |
|---|---|
| C | 78.03 |
| H | 10.97 |
| O | [1] 11.00 |

[1] By difference.

This analysis closely approximates the empirical formula $C_9H_{16}O$.

*Example 2.*—One mole of formaldehyde and one mole of tertiary butyl alcohol at a pressure of about one hundred pounds per square inch.

|  | Grams |
|---|---|
| 40% solution HCHO | 510 |
| Tertiary butyl alcohol | 444 |
| 50% sulphuric acid | 100 |

The above three materials in the amounts stated were dissolved together, placed in an autoclave and heated at a pressure of about one hundred pounds for about three hours, and the reaction products neutralized with sodium hydroxide, or neutralized with potassium carbonate, the resulting top oily layer separated from the water solution, and was distilled. A fraction, boiling up to about 120° C. and containing tertiary butyl alcohol, represented about two-thirds of the total theoretical yield, and had a specific gravity of 0.886. This fraction dissolves ethyl cellulose and cellulose nitrate very readily and can be used as a solvent for these materials. It can also be used in combination with other solvents such as acetone, phthalates and so on for lacquer solvents. Even though this fraction contains tertiary butyl alcohol the above solubility property shows the solvent power of these alcohol-formaldehyde reaction products. The fraction between 150–175° C. gives increased solubility over the lower boiling fraction. Even the material which has been reacted to the stage where it is not soluble in water also shows extreme solvent action toward nitrates, cellulose ethers and cellulose acetate. Where the boiling point is extremely high this solubility may be made use of as a plasticizer for the above mentioned materials together with resins, oils, varnishes and the like. The higher boiling fractions have a very pleasant odor and may be used as perfume bases, plasticizers for rubber, leather goods, phenolic resins, etc. The fraction taken between 150° C. and 175° C. on analysis gave the following:

|   | Per cent |
|---|---|
| C | 59.66 |
| H | 10.53 |
| O | [1] 29.81 |

[1] By difference.

This analysis closely approximates the empirical formula $C_5H_{12}O_2$. A fraction taken between 200° C. and 210° C. has a specific gravity of 0.98, contains hydroxyl group, and analysis shows the following:

|   | Per cent |
|---|---|
| C | 59.34 |
| H | 10.86 |
| O | [1] 29.80 |

[1] By difference.

This analysis closely approximates the empirical formula $C_{13}H_{24}O_4$.

Example 3.—Two moles of formaldehyde and one mole of tertiary butyl alcohol at atmospheric pressure.

|   | Grams |
|---|---|
| 40% water solution HCHO | 425 |
| Tertiary butyl alcohol | 185 |
| 50% sulphuric acid | 122 |

The above three materials in the amounts stated were dissolved together and refluxed at the boiling point of the mixture for about six hours, neutralized and the top oily layer separated from the bottom water layer as described in examples above. No formaldehyde was detected after the reaction. The top layer was oily in appearance and to the feel and had a specific gravity of 1.02.

Example 4.—Two moles of formaldehyde and one mole of tertiary butyl alcohol at a pressure of about one hundred pounds.

|   | Grams |
|---|---|
| 40% water solution HCHO | 680 |
| Tertiary butyl alcohol | 300 |
| 50% sulphuric acid | 20 |

The above three materials in the amounts stated were dissolved together, placed in an autoclave and heated at a pressure of about one hundred pounds per square inch for about three hours, and the resulting reaction products neutralized, separated from the water layer and distilled. Fractions taken between 200° C. and 270° C. had specific gravities of from 1.03 to 1.06. They were all soluble in alcohol, benzene, and water but were insoluble in gasoline.

Example 5.—Three moles of formaldehyde and one mole of tertiary butyl alcohol, at atmospheric pressure.

|   | Grams |
|---|---|
| 40% water soluble HCHO | 765 |
| Tertiary butyl alcohol | 222 |
| 50% sulphuric acid | 200 |

The above three materials, in the stated amounts, were dissolved together and heated to boiling under a reflux condenser for about three hours, at which time all odor of formaldehyde had disappeared. The reaction mixture was neutralized with about eighty grams of sodium hydroxide, and the reaction products which rose to the top were separated from the bottom layer of salt solution, dehydrated with sodium carbonate and distilled in vacuum (about 10 mm. of mercury). A cut which distilled between 215° C. and 280° C. (atmos. press.) had a specific gravity of 1.09. It was soluble in alcohol, benzene and water, but was insoluble in gasoline.

Example 6.—Three moles of formaldehyde and one mole of tertiary butyl alcohol at atmospheric pressure.

|   | Grams |
|---|---|
| 40% water solution HCHO | 255 |
| Tertiary butyl alcohol | 74 |
| Hydrochloric acid | 10 |

The above three materials, in the stated amounts, were heated to boiling under a reflux condenser for about six hours. After neutralizing the reaction mixture, an upper oily layer was separated from a bottom water layer, dehydrated and distilled. A cut distilling between 175° C. and 260° C. gave on analysis:

|   | Per cent |
|---|---|
| C | 58.27 |
| H | 9.62 |
| O | [1] 32.11 |

[1] By difference.

This closely approximates the empirical formula $C_{13}H_{26}O_4$.

Example 7.—Three moles of formaldehyde and one mole of tertiary butyl alcohol at atmospheric pressure.

|   | Grams |
|---|---|
| 40% water solution HCHO | 765 |
| Tertiary butyl alcohol | 222 |
| 50% sulphuric acid | 100 |

The above three materials, in the amounts stated, were heated to boiling under a reflux condenser for about six hours, at which time all traces of formaldehyde had disappeared. After neutralizing the reaction mixture, an upper oily layer was separated from a bottom water layer containing the salts formed by neutralization, dehydrated and distilled. A cut taken between 230° C. and 260° C. (atmospheric pressure) gave the following analysis:

|   | Per cent |
|---|---|
| C | 57.46 |
| H | 9.28 |
| O | [1] 33.26 |

[1] By difference.

This approximates the empirical formula of $C_9H_{18}O_4$.

*Example 8.*—Three moles of formaldehyde and one mole of tertiary butyl alcohol at about one hundred pounds pressure per square inch.

|  | Grams |
|---|---|
| 40% water solution HCHO | 765 |
| Tertiary butyl alcohol | 222 |
| 50% sulphuric acid | 5 |

The above three materials, in the stated amounts, were heated under a reflux condenser for about three hours, neutralized and the oily top layer separated and dehydrated, similarly to the treatment in the above examples.

*Example 9.*—Nine moles of formaldehyde and one mole of tertiary butyl alcohol at about one hundred pounds pressure per square inch.

| 40% water solution HCHO | grams | 720 |
|---|---|---|
| Tertiary butyl alcohol | do | 74 |
| Sulphuric acid (conc.) | cubic centimeter | 0.75 |

The above three materials, in the stated amounts, were heated in an autoclave to one hundred pounds per square inch pressure and held there for one hour. It was then cooled to room temperature. Some odor of formaldehyde still remained. There was no separation of layers. Accordingly, after neutralization, the mixture was subjected to fractional distillation at atmospheric pressure. The residue above 135° C. was a viscous oil.

By removing by distillation from each of the products produced by following Examples 1 to 9, the fraction having a boiling point as high as 135° C., the remaining product in each case is of an oily nature and is soluble in ethyl alcohol and benzene and at least partially soluble in water but substantially insoluble in gasoline. By removing by distillation from each of said remaining products that fraction having a boiling point as high as 250° C., the remaining fraction is also soluble in ethyl alcohol and benzene. While each of these remaining fractions is partially soluble in water, it is less soluble than said remaining product from which it was obtained.

Although most of the examples presented have utilized sulphuric acid as the mineral acid condensing agent, it has been found that hydrochloric acid can be substituted for the sulphuric acid with no change in either the yield or the properties of the products obtained as shown by a comparison of Examples 6 and 7. There is one exception to this statement. Lighter colored products have resulted from the use of sulphuric acid. The quantity of acid used, it will be noted, varies considerably with the pressure under which the reaction is carried out. At pressures greater than atmospheric pressure much less acid need to be used and lighter-colored products are possible.

The most important factor, as regards percentage yield of higher boiling material, as well as specific gravity, is the ratio of formaldehyde to the tertiary alcohol. When the mole ratio of the formaldehyde to the alcohol is as great as about 3 to 1, the yield of the products boiling above 135° C. is greater than 100% of the quantity of the alcohol originally present.

The higher boiling products obtained by the methods of this invention are new materials and of unknown chemical composition. That they are not merely formals is evidenced from a consideration of the properties of the products obtained and also from the observation that larger amounts of formaldehyde than even equal molecular proportions are condensed with the alcohol in the method of this invention.

The specific gravities of the products boiling above 135° C. obtained by the method of this invention are all close to, or greater than one, whereas the formals of alcohols having from four to six carbon atoms which have been described in the literature, all have specific gravities below 0.85. Thus, according to Arnhold in "Annalen der Chemie" vol. 240, page 203, (1887), the formal of isobutyl alcohol has a density of 0.284 and isoamyl alcohol a density of 0.835.

In addition, there is the difference in solubility in petroleum hydrocarbons. The products obtained by this invention, boiling above 135° C. are almost totally insoluble in gasoline whereas the formals of the lower alcohols are appreciably soluble in gasoline. This was determined by actual test with formals obtained on the open market and confirmed by the disclosure in Ellis' Patent No. 2,143,870 where it is pointed out that the formals of the lower alcohols are soluble in gasoline to the extent of at least 5% by volume.

The products boiling above 135° C. obtained in accordance with the methods of the present invention have been found to be solvents for such materials as cellulose nitrate, cellulose acetate, polyvinyl esters and some grades of polyvinyl alcohol. Although the water solubility of some of the products may be a disadvantage in their use as plasticizers or as solvents for various plastics, in other instances where extreme oil resistance is desired, their use is decidedly beneficial. Furthermore, these materials can be made water insoluble without changing their other solvent characteristics by an acylating reaction such as by reaction with acetic anhydride, butyric anhydride, etc.

All of the organic condensation products and all fractions thereof produced in the manner hereindisclosed are soluble in ethyl alcohol and benzene and are substantially unaffected by hot dilute mineral acids. And, a yield of condensation products as great as and more than about 100% of the quantity of tertiary alcohol originally present is obtained by said methods when the mole ratio of the formaldehyde in aqueous solution to the tertiary alcohol used is as great as about 3 to 1.

I claim:

1. The method for producing an organic condensation product being substantially unaffected by hot dilute mineral acid and soluble in ethyl alcohol, comprising heating together from one to eight moles of formaldehyde in aqueous solution and one mole of tertiary butyl alcohol in the presence of a mineral acid until such product is formed.

2. The method for making an organic condensation product soluble in ethyl alcohol and being unaffected by hot dilute mineral acid and whose yield is as great as about 100% of the quantity of tertiary butyl alcohol originally present, comprising heating until said product is obtained at said yield tertiary butyl alcohol and an aqueous solution of formaldehyde in the presence of a mineral acid, the mole ratio of the formaldehyde in said solution to said tertiary butyl alcohol being at least as great as about 3 to 1.

3. The method for making an organic condensation product being soluble in ethyl alcohol and being substantially unaffected by dilute mineral acid, which comprises in the presence of a mineral acid completely reacting one mole of tertiary butyl alcohol with more than one mole of formaldehyde in aqueous solution.

4. The method of making condensation products, which comprises heating together from one to eight moles of formaldehyde in water solution and one mole of tertiary butyl alcohol, in the presence of a mineral acid, and removing therefrom the portion of the condensation products boiling below about 135° C.

5. A product having fractions whose boiling points are above 135° C. and obtained by heating together from one to eight moles of formaldehyde in water solution and one mole of tertiary butyl alcohol, in the presence of a mineral acid.

6. A product whose boiling point is above 135° C. and obtained by heating together from one to eight moles of formaldehyde in water solution and one mole of tertiary butyl alcohol, in the presence of a mineral acid.

MORTIMER T. HARVEY.